Feb. 16, 1960 J. J. LYNOTT 2,925,238

POSITIONING MECHANISM

Filed Jan. 26, 1956

INVENTOR.
JOHN J. LYNOTT

BY John B. Clark

ATTORNEY 2,925,238

POSITIONING MECHANISM

John J. Lynott, Los Gatos, Calif., assignor to International Business Machines Corporation, New York, N.Y., a corporation of New York Application January 26, 1956, Serial No. 561,604

2 Claims. (Cl. 248—295)

The present invention pertains generally to positioning mechanisms and relates more particularly to mechanisms for accurately referencing magnetic transducers relative to magnetic recording media.

In magnetic storage devices of the type disclosed in the copending application of L. D. Stevens, et al., Serial No. 477,468 filed December 24, 1954 which is assigned to the assignee of the present invention, wherein magnetic transducers associated with an array of discs are selectively positioned in each of two directions to locate the transducers adjacent selected tracks of selected discs, it is mandatory to position the transducers adjacent a selected disc with sufficient accuracy to prevent the transducers and/or the supporting structure therefor from colliding with the discs when the transducers are meshed therewith for positioning them adjacent selected tracks thereon.

Additionally, it is often desirable to utilize a timing or clock track which is recorded on one of the discs for timing data transfer to or from the other tracks of the various discs. In this case, a separate transducer is provided for reading the clock track, and it will be understood that it is essential that the data transducers be referenced very closely to the clock track transducer whenever data is being recorded or read from the discs, since, if this is not the case, phasing errors will result. That is, assuming that the data transducers are moved to a given track on one of the discs and that data is recorded on that track under the control of the clock track, the data transducers are disposed timewise relative to the clock transducer in a given position along this track. If the data transducers are moved from this track and are then moved back to it for reading data therefrom, it will be clear that unless the data transducers are positioned along the track very close to where they were positioned when the data was recorded, errors due to difference in phase between the data pulses and the clock pulses may result. Thus, it is also very desirable that the movable transducers always be referenced closely to the clock transducer.

Thus, it is one object of the present invention to provide an improved positioning mechanism.

Another object is to provide an improved mechanism for referencing a movable transducer to a recording surface.

A further object is to provide a novel mechanism for accurately locating transducers adjacent selected recording media.

Still another object is to provide a novel device for accurately positioning transducers adjacent selected recording media and for accurately positioning the transducers at selected tracks on the selected recording media.

A still further object is to provide a mechanism for positioning a transducer adjacent a selected one of several discs and for positioning the transducer between the discs and adjacent a selected track on a selected disc, wherein improved means are provided for referencing the transducers to the discs to prevent collision of the transducer with the discs when the transducer is moved therebetween.

Another object is a provide a mechanism for positioning a transducer adjacent selected data tracks on a recording medium having a plurality of tracks, wherein improved means are provided for accurately referencing the transducer to selected tracks for maintaining the phase angle between data read from selected tracks and timing data read from others of said tracks at a minimum.

Other objects of the invention will be pointed out in the following description and claims and illustrated in the accompanying drawings, which disclose, by way of example, the principle of the invention and the best mode which has been contemplated of applying that principle.

Figures 1, 2, 3:
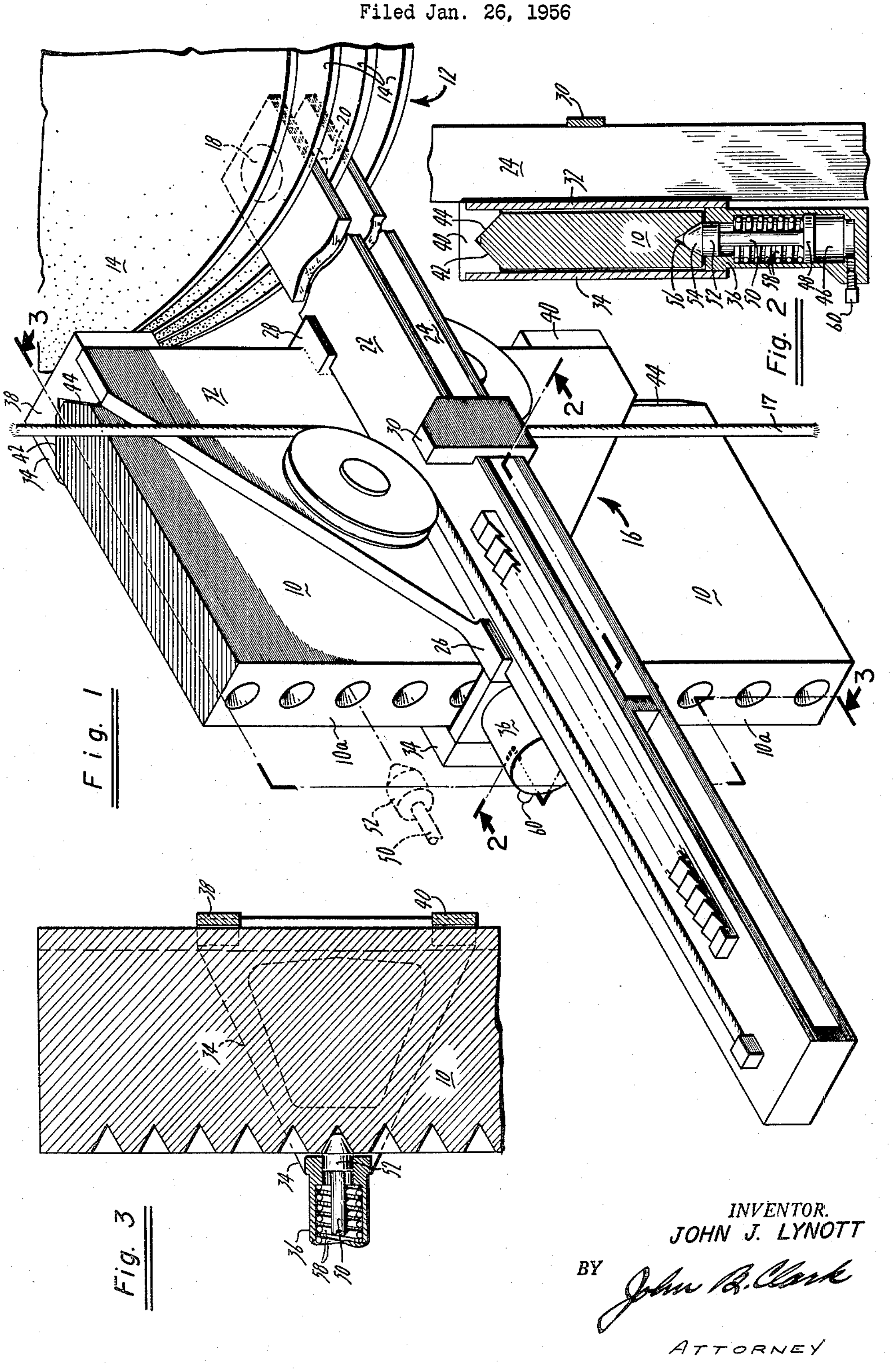
Fig. 1 is a partial perspective view of a data storage device provided with an embodiment of the present invention.
Fig. 2 is a partial horizontal section taken along line 2—2 of Fig. 1.
Fig. 3 is a partial vertical section taken along line 3—3 of Fig. 1.

Referring now to Fig. 1, a way 10 is fixedly supported by means not shown adjacent an array 12 of discs 14. The discs 14 are supported for rotation upon a common shaft as shown in the aforementioned copending application, and the way 10 is provided to guide the movement of a carriage 16 therealong, axially of the disc array, to position transducers 18 and 20 at selected disc tracks, as will become clear. The transducers 18 and 20 are supported by spaced arms 22 and 24, respectively, near one end thereof, and these arms are slidably supported by the carriage 16 between three triangularly arranged guides 26, 28 and 30, which are formed integrally with or otherwise affixed to the carriage 16. In this way, the arms 22 and 24 are mounted for movement laterally of the way 10 and radially of the discs 14. The arms 22 and 24 are arranged to straddle the disc 14 corresponding to the position of the carriage 16 relative to the disc array 12, to permit the transducers 18 and 20 to cooperate with opposite sides of each such disc.

Selective positioning of the carriage 16 and arms 22 and 24 to position the transducers 18 and 20 adjacent selected recording tracks of selected discs 14 may be controlled in any suitable manner such as is fully disclosed in the aforementioned copending application or in a copending application of W. E. Dickinson, Serial No. 555,006 filed December 23, 1955 which is assigned to the assignee of the present invention. To position the transducers 18 and 20 at a selected track on a given one of the discs 14, the carriage 16 is first moved to the disc desired, the arms 22 and 24 having been withdrawn to clear the disc array, and the arms are then moved to mesh with the discs so that they straddle the desired disc to position the transducers in operative relation to the selected tracks on that disc. The cable designated by reference character 17 in Fig. 1 of the drawing illustrates schematically one suitable means for moving the carriage rapidly along the way, although other suitable means operable to achieve the same function may be employed if desired. Cable 17 corresponds to the similarly referenced cable in Fig. 1 of the above-mentioned copending application of W. E. Dickinson, Serial No. 555,006. As disclosed therein, the cable is effectively connected directly to the carriage during movement of the carriage since the horizontal arm which carries the transducers is locked in its fully rejected position. The cable is driven by a pulley attached to a shaft whose direction and speed of rotation are controlled by a pair of magnetic clutches. It is thus possible to move the carriage along the way quite rapidly.

When the arms 22 and 24 are moved to straddle a given disc, it is necessary that the carriage 16 be positioned along the way 10 relative to the disc with sufficient accuracy to permit them to straddle that disc without colliding therewith. Additionally, when coded data is recorded on or read from one of the disc tracks via the transducers 18 and 20 and under the control of a clock track recorded on another of the discs, it will be understood by those familiar with magnetic storage that it is imperative that the transducers be accurately referenced to the clock track transducer to maintain any difference in phase between the data pulses and the clock pulses at a minimum. It is for these reasons that the novel structure next to be described is provided.

The carriage mentioned earlier and generally designated as 16 includes two substantially triangularly shaped side plates 32 and 34 (Fig. 2) spaced at the apex thereof by a block 36 and at the other two corners by notched blocks 38 and 40 (Fig. 3). The plates 32 and 34 and the blocks 36, 38 and 40 are arranged to loosely surround the way 10 to permit the carriage to be freely moved along the way without binding. The way 10 is provided with beveled surfaces 42 and 44 (Fig. 2) at one side thereof, which surfaces serve to reference the carriage to the way, and thus to the disc array, in both the horizontal and vertical planes, as viewed in Fig. 1. The blocks 38 and 40 are notched, as mentioned above, to coincide with and receive the beveled surfaces 42 and 44 (see Figs. 1 and 2).

The block 36, disposed between the plates 32 and 34, is bored to form a chamber 46 within which is slidably disposed a piston 48. The piston 48 is affixed to a shaft 50 which in turn is formed integrally with a detent 52 having a conical surface 54 arranged to engage with one of a plurality of similarly shaped indentations 56 provided in the rear surface 10*a* (Fig. 1) of the way 10. The dentent 52 (Fig. 2) is biased to retract from the way 10 by a spring 58, and the piston 48 is operated to drive the detent 52 to the way by air under suitable pressure furnished to the cylinder via an air line 60.

When the carriage 16 is positioned at a selected disc, means are provided to furnish air to the air line 60 to thereby drive the detent 52 into the indentation 56 corresponding to the selected disc. It should be noted that the carriage at this time contacts the way at three points, i.e., at the blocks 38 and 40 and at the detent 52. If the indentations are suitably located and if the detent is driven into the indentation 56 with sufficient force, the carriage is aligned to the way in a predetermined vertical plane since each block 38 and 40 is drawn to the beveled surfaces 42 and 44 to the position shown in Fig. 3, and when the arms 22 and 24 are driven to mesh with the discs, they lie in a predetermined horizontal plane wherein they will straddle the selected disc without mishap. This action is aided by the conical shape of the detent 52 and of the indentations 56. When the detent is driven into an indentation, the carriage is positioned thereby until the detent seats properly, at which time the arms 22 and 24 are aligned with the selected disc.

In addition to aligning the carriage to position the arms in predetermined horizontal planes, as viewed in Fig. 1, the novel structure disclosed herein serves to accurately align the transducers in a predetermined vertical plane and to thereby prevent phasing errors. When the detent is actuated, that portion of the carriage closest to the disc array is drawn against and is referenced to the beveled surfaces 42 and 44, as explained above, and when the detent seats in the indentation corresponding to the selected disc, the carriage, and thus the arms 22 and 24 and transducers 18 and 20 carried thereby, are accurately positioned. This is true since the plane containing the line of intersection of the planes of the beveled surfaces 42 and 44 and the central axis of the indentations 56 is forced by the seated detent to coincide with the plane containing the line of intersection of the beveled surfaces of the notches provided in the blocks 38 and 40 and the central axis of the detent. Thus, by means of the present invention the transducers are accurately positioned relative to the disc array to prevent mishaps resulting from collision between the transducers and the disc array as well as to substantially eliminate phasing errors in reading and/or recordation of data on the discs.

While there have been shown and described and pointed out the fundamental novel features of the invention as applied to the preferred embodiment, it will be understod that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A positioning device comprising a way member having a pair of longitudinally extending reference surfaces disposed in converging planes which intersect to define a reference line and a plurality of conical depressions disposed with their axes in a plane which bisects the angle defined by said converging planes, the intersection of each said axis with said reference line defining a position of said device, a carriage loosely mounted on said way for rapid movement therealong including reference faces complementary to and engageable with said reference surfaces, means for rapidly moving said carriage to the approximate location of a preselected one of said positions, a normally retracted conical detent movable with said carriage and engageable with said conical depression corresponding to said preselected one position, and means for driving said detent into said depression to urge said reference faces against said reference surfaces and simultaneously move said carriage longitudinally to position said carriage accurately on said way.

2. A positioning device comprising a way member having a pair of longitudinally extending reference surfaces disposed in converging planes which intersect to define a reference line, and a plurality of conical depressions disposed with their axes in parallel spaced relationship in a plane which bisects the angle defined by said converging planes, the intersection of each said axis with said reference line defining a position of said device, a carriage loosely mounted on said way for rapid movement therealong including reference faces complementary to and engageable with said reference surfaces, means for rapidly moving said carriage to the approximate location of a preselected one of said positions, a detent mechanism mounted on said carriage comprising a conical detent element disposed for movement parallel to the axes of said conical depressions and engageable with said conical depression corresponding to said preselected one position, means for maintaining said detent element in a retracted position during said rapid movement, and means for driving said detent into said depression to urge said reference faces against said reference surfaces and simultaneously move said carriage longitudinally to position said carriage accurately on said way.

References Cited in the file of this patent

UNITED STATES PATENTS

| | | |
|---|---|---|
| 185,004 | White | Dec. 5, 1876 |
| 784,644 | Warner | Mar. 14, 1905 |
| 786,430 | Devereux | Apr. 4, 1905 |
| 2,495,106 | Kes | Jan. 17, 1950 |

FOREIGN PATENTS

| | | |
|---|---|---|
| 422,592 | Italy | Nov. 26, 1946 |